US012654363B2

(12) United States Patent (10) Patent No.: US 12,654,363 B2
Benart et al. (45) Date of Patent: Jun. 16, 2026

(54) HEAT TREATMENT OF A REINFORCEMENT ELEMENT

(71) Applicant: COMPAGNIE GENERALE DES ETABLISSEMENTS MICHELIN, Clermont-Ferrand (FR)

(72) Inventors: Sarah Benart, Clermont-Ferrand (FR); Gaetan Davayat, Clermont-Ferrand (FR); Pierre Morisot, Clermont-Ferrand (FR); Remi Pinaut, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 94 days.

(21) Appl. No.: 18/017,174

(22) PCT Filed: Jul. 7, 2021

(86) PCT No.: PCT/FR2021/051255
§ 371 (c)(1),
(2) Date: Jan. 20, 2023

(87) PCT Pub. No.: WO2022/018341
PCT Pub. Date: Jan. 27, 2022

(65) Prior Publication Data
US 2023/0294329 A1      Sep. 21, 2023

(30) Foreign Application Priority Data
Jul. 24, 2020      (FR) ....................................... 2007792

(51) Int. Cl.
B29B 15/12 (2006.01)
B29D 30/38 (2006.01)

(52) U.S. Cl.
CPC ............ B29B 15/122 (2013.01); B29D 30/38 (2013.01); B29D 2030/381 (2013.01)

(58) Field of Classification Search
CPC ....... B29B 15/12; B29B 15/122; B29D 30/38; B29D 2030/381; B29D 30/44
See application file for complete search history.

(56) References Cited

U.S. PATENT DOCUMENTS

| | | |
|---|---|---|
| 8,650,850 B2 | 2/2014 | Barguet et al. |
| 10,464,248 B2 | 11/2019 | Nomura |
| 2005/0167033 A1* | 8/2005 | Iwasaki .................. B29C 70/50 |
| | | 156/272.4 |
| 2006/0237110 A1 | 10/2006 | Barguet et al. |

(Continued)

FOREIGN PATENT DOCUMENTS

| | | |
|---|---|---|
| DE | 112014006853 T5 | 4/2017 |
| EP | 1486319 A1 | 12/2004 |

(Continued)

OTHER PUBLICATIONS

International Search Report dated Sep. 29, 2021, in corresponding PCT/FR2021/051255 (5 pages).

*Primary Examiner* — Alison L Hindenlang
*Assistant Examiner* — Shibin Liang
(74) *Attorney, Agent, or Firm* — VENABLE LLP

(57) ABSTRACT

A method for manufacturing a reinforced ply comprising an elastomer composition and at least one metallic reinforcing element includes subjecting the reinforcer to a specific heat treatment.

11 Claims, 1 Drawing Sheet

(56)         References Cited

U.S. PATENT DOCUMENTS

| | | | |
|---|---|---|---|
| 2008/0026244 | A1 | 1/2008 | Barbotin et al. |
| 2008/0190549 | A1* | 8/2008 | Takagi .................. B29C 53/582 |
| | | | 156/397 |
| 2010/0168306 | A1 | 7/2010 | Barbotin et al. |
| 2016/0281297 | A1 | 9/2016 | Verleene et al. |
| 2017/0210049 | A1 | 7/2017 | Nomura |
| 2020/0165695 | A1* | 5/2020 | Park ....................... C21D 8/065 |

FOREIGN PATENT DOCUMENTS

| | | | |
|---|---|---|---|
| EP | 3620543 | A1 | 3/2020 |
| FR | 3041282 | A1 | 3/2017 |
| JP | 2007-55158 | A | 3/2007 |
| WO | 2005/071157 | A1 | 8/2005 |
| WO | 2018/141566 | A1 | 8/2018 |
| WO | 2019/081862 | A1 | 5/2019 |

* cited by examiner

[Fig 1]
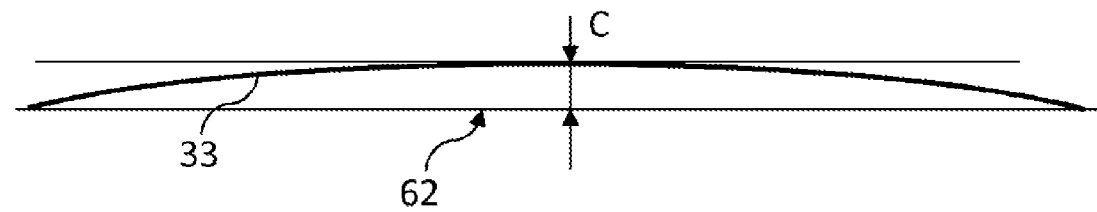
[Fig 2]
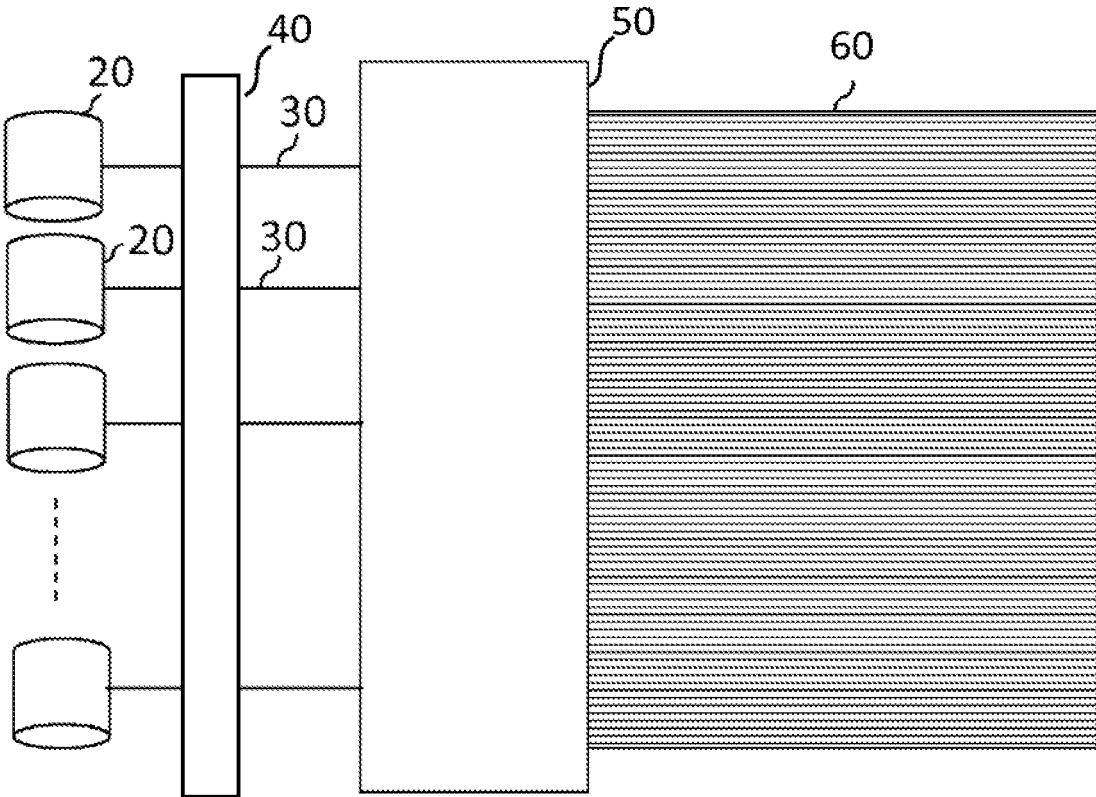

HEAT TREATMENT OF A REINFORCEMENT ELEMENT

TECHNICAL FIELD OF THE INVENTION

The present invention relates to the field of methods for processing metallic reinforcers, in particular metallic reinforcers used in reinforced plies for tires, and to the reinforcers obtained by such methods.

PRIOR ART

A tire is obtained by the assembly and then curing of a green tire. The green tire comprises a plurality of uncured elastomer components in the form of plies. A longitudinal portion of a ply is positioned circumferentially on the green tire being manufactured, and then the two ends of the portion are butted together.

A ply is optionally reinforced by metallic reinforcers, the majority of said reinforcers being filamentary elements consisting of a monofilament, or an assembly of monofilaments. Hereinafter, the expressions "reinforced ply" and "elastomer composite" will be used interchangeably. The metallic reinforcers are generally positioned inside the ply, in a single plane when the ply is laid flat, parallel to one another and evenly spaced. They can also be inclined, such that they form a given angle with the longitudinal direction of the ply.

The manufacturing of a reinforced ply comprises in particular steps of winding and storing a plurality of metallic reinforcers on a plurality of reels. One pass of a monofilament wound on a reel is known as a turn. The set of turns is known as a winding. Next, the manufacturing of the reinforced ply comprises a step during which this plurality of metallic reinforcers is unwound from the plurality of reels. The metallic reinforcers are then positioned, as described above, parallel to the longitudinal direction of the ply being manufactured, and then embedded in a layer of uncured rubber using a calendering or extrusion method. A reinforced ply comprising metallic reinforcers that form a given angle with the longitudinal direction is obtained by cutting, with a bevel of given angle and at regular intervals, a ply obtained at the end of the embedding step, then by assembling the cuts by their uncut edges.

Storing the metallic reinforcer on a reel causes deformation of the metallic reinforcer. The path formed by the metallic reinforcer when unwound from the reel at the end of storage and free of any external stress is slightly curved. The straightness defect, measured by a method that will be described hereinafter in the description, is known as the bend.

The bend of a plurality of metallic reinforcers results in shape defects of the reinforced ply in which the filamentary element(s) is/are positioned, such as undulations, twists, curling, imprecise cutting of the ply into portions, or difficult positioning and abutting of a portion of the ply on the green tire.

While it is possible to manually lay a ply having shape defects, this can only be envisaged for the manufacture of a limited number of tires due to the poor industrial productivity thereof. When automated, the laying of a ply having shape defects beyond a certain threshold proves to be difficult if not impossible.

In order to solve this problem, WO2018/141566 proposes correcting the flatness defects of a reinforced ply by applying plastic deformation thereto by means of a correction device comprising a cylinder.

However, the closer the metallic reinforcer is wound to the hub of the reel, the more the bend resulting from storage of the metallic reinforcer increases. In the other words, the bend resulting from storage is not constant along the metallic reinforcer due to the filling of the reel, while reverse bending imparts on the thread a radius of curvature of opposite sign but constant. Consequently, although reverse bending does make it possible to reduce the mean bend of the metallic reinforcer and the bend of the metallic reinforcer close to the hub of the reel, it can increase the bend of the metallic reinforcer away from the hub.

WO2019/081862 proposes storage reels having a larger hub diameter, so as to reduce the difference in the radius of curvature of the reinforcing element between the portions of the elements stored close to the hub and those stored on the periphery. Although it provides good results, this solution requires the use of non-standard reels.

EP 3 620 543 describes a cord obtained by a method comprising steps of wire drawing, heat treatment and winding onto storage means, said cord having, for a 400 mm portion, a deviation from the vertical less than or equal to 30 mm after having been wound for between 6 months and one year. The heat treatment particularly satisfies condition (A): $T+13.67 \cdot \ln(t)+2.7 \cdot \tau \geq 425$, where T is the heating temperature in K, t is the heating time in seconds, and $\tau$ is the tension applied to the cord in kgf. The heat treatment is applied specifically to the cord between the wire drawing step and the winding step. However, as shown in the examples, a number of cords having been subjected to heat treatment satisfying condition (A) have a deviation from the vertical (or straightness) much greater than 30 mm after 7 months of being wound. The relationship between condition (A) and the reduction in bend is thus not very clear.

Consequently, the need remains for a simple solution that can be applied to the reinforcer before it is incorporated into a reinforced ply by calendering or extrusion, making it possible to ensure satisfactory flatness of said ply and thus facilitate its industrial processing, in particular for manufacturing tires.

During its research, the applicant has discovered a treatment that can be applied to a metallic reinforcer between its storage means and the step of incorporation into an elastomer composition, making it possible to ensure sufficiently little bend to ensure the satisfactory flatness of the ply, without the need to measure the bend taken on by the reinforcer during storage, whether said bend is due to the storage means or the storage time. By virtue of the invention, reinforcing elements originating from different sources, whether or not they have received anti-bending treatment before storage, can be used without distinction.

SUMMARY OF THE INVENTION

The invention relates to a method for manufacturing a reinforced ply comprising an elastomer composition and at least one metallic reinforcing element, wherein said reinforcer is subjected to at least the following successive steps:

a. The reinforcer is unwound from storage means on which the reinforcer is wound;

b. The reinforcer resulting from the unwinding step is heat treated under temperature and time conditions such that $T+13.7 \cdot \ln(t)>175$, where T is the treatment temperature in C.° and t is the time for which the reinforcer is kept at the temperature T in seconds;

c. The reinforcer resulting from the heat treatment step is fed into a step in which said reinforcer is embedded in an elastomer composition.

DETAILED DESCRIPTION

Definitions

The compounds comprising carbon mentioned in the description can be of fossil or biobased origin. In the latter case, they can result partially or completely from biomass or be obtained from renewable raw materials resulting from biomass. This relates in particular to polymers, plasticizers, fillers, etc.

Step a) of Unwinding the Reinforcer

The method for manufacturing a reinforced ply according to the invention comprises a step during which the reinforcer is unwound from storage means on which the reinforcer is wound.

The storage means is usually a storage reel comprising a hub and two flanges. The dimension of the reel depends on the reinforcer stored and is a compromise between the quantity of reinforcer desired and the constraints linked to the use of a method or to transport. The dimensions are standardized in order to facilitate the use thereof. Reels particularly useful for the purposes of the invention have a hub diameter of between 100 mm and 200 mm.

The reinforcer is a metallic reinforcer. The metallic reinforcer can be a single metallic filamentary element, that is, a metallic elementary monofilament. Such a metallic elementary monofilament comprises a steel core, optionally coated with one or more layers of a coating which can be metallic and/or based on a non-metallic adhesive composition.

The metallic coating comprises a metal selected from zinc, copper, tin, cobalt and the alloys of these metals. Examples of alloys of these metals include brass and bronze. The steel of the core is a carbon steel comprising between 0.1% and 1.2% by weight of carbon, at most 11% by weight of chromium and less than 1% by weight of each of the following elements: manganese, silicon, aluminum, boron, cobalt, copper, molybdenum, nickel, niobium, titanium, tungsten, vanadium, zirconium, phosphorus, sulfur and nitrogen, the remainder being made up of iron and unavoidable impurities resulting from preparation. The steel can have a pearlitic, ferritic, austenitic, bainitic or martensitic microstructure or a microstructure originating from a mixture of these microstructures.

The metallic elementary monofilament has a mechanical strength ranging from 1,000 MPa to 5,000 MPa. Such mechanical strengths correspond to the steel grades commonly found in the field of tires, namely the grades NT (normal tensile), HT (high tensile), ST (super tensile), SHT (super high tensile), UT (ultra tensile), UHT (ultra high tensile) and MT (mega tensile), the use of high mechanical strengths optionally permitting improved reinforcement of the matrix in which the reinforcing element is to be embedded and a reduction in the weight of the matrix so reinforced.

If the metallic elementary monofilament has a circular cross-section, the diameter of these metallic elementary monofilaments preferentially ranges from 0.05 mm to 0.60 mm. Very preferably, the diameter of the metallic filamentary element ranges from 0.18 mm to 0.45 mm.

The metallic reinforcer can be an assembly of a plurality of metallic filamentary elements, that is, a plurality of metallic elementary monofilaments as described above, assembled together in a helix, for example by cabling or twisting the metallic elementary monofilaments in order to form, for example, layered cords comprising several concentric layers of metallic elementary monofilaments or stranded cords, each strand comprising several concentric layers of metallic elementary monofilaments. Optionally and as described in WO2005071157, such a metallic filamentary element comprises a layer based on a polymer composition, preferably a composition comprising an elastomer, this layer being positioned between two layers of metallic elementary monofilaments of the layered cord or of a strand of the stranded cord.

Preferably, a plurality of reinforcers is unwound from a plurality of storage means.

Step b) of Heat Treatment

According to the invention, the reinforcer resulting from the unwinding step is heat treated in a heat treatment step b), under temperature and time conditions such that $T+13.7\cdot\ln(t)>175$, where T is the treatment temperature in C.° and t is the time for which the reinforcer is kept at the temperature T in seconds.

Applying this heat treatment to the reinforcer makes it possible to reduce the bend resulting from the storage of the reinforcer to values close, or even identical, to the bend of the reinforcer measured at the end of the manufacturing process thereof, that is, at the end of the wire drawing or assembly process, typically a bend value of less than 20 mm.

Preferably, step b) is carried out under temperature and time conditions such that $T+28.4\cdot\ln(t)<398$.

Preferably, the heat treatment time is within an interval ranging from more than 0 to less than 5 s and the temperature is within an interval ranging from more than 200 to 400° C.

Preferably, the treatment time of step b) is within an interval ranging from more than 0 to less than 60 s, preferentially from more than 0 to less than 20 s, very preferentially from more than 0 to less than 5 s, and preferably 0 to 2 s.

Preferably, the temperature is within an interval ranging from 130 to 400° C.

Very preferably, the treatment time of step b) is within an interval ranging from more than 0 to less than 20 s, where T is less than or equal to 300° C. if the treatment time is less than 2 s, and $T-23.8\cdot\ln(t)<315$ for a treatment time ranging from 2 to less than 20 s. These conditions maintain the mechanical strength of the reinforcer.

The heat treatment can be carried out by any means known to a person skilled in the art. The reinforcer can be heated by conduction, convection or induction, preferentially by induction.

During the heat treatment, the reinforcer preferentially travels in a chamber in which the heating means are applied, the dimensions of the chamber and the run speed determining the duration of the heat treatment.

The duration of the heat treatment of the method according to the invention makes it possible to maintain the calendering speeds commonly used in industrial methods, in particular the methods for manufacturing tires.

In the case of a plurality of reinforcers, each reinforcer can be treated individually, or the plurality of reinforcers can be treated collectively. Preferably, the plurality of reinforcers is treated collectively. This preferred arrangement allows for particularly efficient industrial processing by collectively treating reinforcers of different origins and having various bends, with reduced costs due to minimizing the amount of treatment equipment.

Step c) of Feeding into a Calendering Step

At the end of the heat treatment step, the reinforcer feeds a step in which it is embedded in an elastomer composition in order to obtain a reinforced ply.

Preferably, the metallic reinforcing element is not coated with a polymer composition prior to step c).

Preferably, the elastomer composition is based on a composition comprising at least one elastomer and at least one filler.

Preferably, the composition comprises an elastomer, preferably a diene elastomer. "Diene" elastomer (or, without distinction, rubber), whether natural or synthetic, is given to mean, as is known, an elastomer at least partially composed (i.e. a homopolymer or a copolymer) of diene monomer units (monomers bearing two conjugated or non-conjugated carbon-carbon double bonds). "Isoprene elastomer" is given to mean, as is known, an isoprene homopolymer or copolymer, in other words a diene elastomer selected from the group consisting of natural rubber (NR), synthetic polyisoprenes (IRs), the various isoprene copolymers and the mixtures of these elastomers.

The diene elastomer is preferentially selected from the group consisting of polybutadienes (BRs), natural rubber (NR), synthetic polyisoprenes (IRs), styrene-butadiene copolymers (SBRs), butadiene-isoprene copolymers (BIRO, styrene-isoprene copolymers (SIRs), styrene-butadiene-isoprene copolymers (SBIRs) and the mixtures of these elastomers, and very preferentially selected from natural rubber and synthetic cis-1, 4-polyisoprene.

Preferably, the elastomer composition used in step c) predominantly comprises a diene elastomer selected from the group consisting of natural rubber, synthetic polyisoprene or a mixture thereof.

The composition can contain one or more diene elastomer(s), and also all or some of the additives usually employed in the matrices intended for the manufacturing of tires, for example fillers such as carbon black or silica, coupling agents, anti-aging agents, antioxidants, plasticizers or extension oils, whether the latter are aromatic or non-aromatic in nature (in particular oils that are very slightly aromatic or non-aromatic, for example of the naphthene or paraffin type, with high or preferably low viscosity, MES or TDAE oils), plasticizing resins with a high glass transition temperature (higher than 30° C.), agents that improve the processability of the compositions in the uncured state, tackifying resins, anti-reversion agents, methylene acceptors and donors, for example HMT (hexamethylenetetramine) or HMMM (hexamethoxymethylmelamine), reinforcing resins (such as resorcinol or bismaleimide), known adhesion promoter systems of the metal salt type, for example, in particular salts of cobalt, nickel or lanthanide, and a crosslinking or vulcanization system.

Preferably, the system for crosslinking the elastomer composition is a system referred to as a vulcanization system, that is, based on sulfur (or on a sulfur donor agent) and a primary vulcanization accelerator. Various known secondary vulcanization accelerators or vulcanization activators can be added to this basic vulcanization system. Sulfur is used at a preferred content of between 0.5 and 10 phr, and the primary vulcanization accelerator, for example a sulfenamide, is used at a preferred content of between 0.5 and 10 phr. The content of reinforcing filler, for example carbon black and/or silica, is preferably higher than 30 phr, in particular between 30 and 100 phr.

All carbon blacks, in particular of the HAF, ISAF or SAF type, conventionally used in tires ("tire-grade" carbon blacks), are suitable. These include more particularly carbon blacks of 300, 600 or 700 (ASTM) grade (for example N326, N330, N347, N375, N683 or N772). Precipitated or fumed silicas having a BET surface area of less than 450 m²/g, preferably 30 to 400 m²/g, are in particular suitable as silicas.

A person skilled in the art will know, in light of the present description, how to adjust the formulation of the rubber compositions in order to achieve the desired levels of properties (in particular modulus of elasticity), and how to adapt the formulation to suit the specific application envisaged.

Preferably, each polymer matrix has, in the crosslinked state, a secant modulus in extension, at 10% elongation, of between 4 and 25 MPa, more preferably between 4 and 20 MPa; values between 5 and 15 MPa in particular have proven to be particularly suitable. Modulus measurements are carried out under tension, unless otherwise indicated, in accordance with ASTM D 412 of 1998 (test specimen "C"): the "true" secant modulus (that is, with respect to the actual cross-section of the test specimen) is measured in second elongation (that is, after an accommodation cycle) at 10% elongation, denoted here by Ms and expressed in MPa (under standard temperature and relative humidity conditions in accordance with ASTM D 1349 of 1999).

Preferably, if there is a plurality of reinforcers, the reinforcers are positioned parallel to each other upstream or downstream of the treatment step b). The plurality of reinforcers thus positioned is then embedded in the elastomer composition.

The step in which the reinforcer or plurality of reinforcers is/are embedded in the elastomer composition can take place by any method known to a person skilled in the art, for example by extrusion or calendering.

The step in which the reinforcer or plurality of reinforcers is/are embedded in an elastomer composition can comprise the following steps:

making two layers of the elastomer composition,
 sandwiching the reinforcing element(s) in the two layers
  by depositing it/them between the two layers,
 where appropriate, curing the reinforced ply.

Alternatively, the reinforcer or plurality of reinforcers is/are embedded in an elastomer composition by depositing the reinforcer or plurality of reinforcers on a portion of a layer of elastomer composition, the layer then being folded over on itself to cover the reinforcer or plurality of reinforcers, which is/are thus sandwiched over its/their entire length or a part of its/their length.

Preferably, steps a) to c) take place continuously, step b) being performed on a continuously travelling portion of reinforcer, the reinforcer preferentially travelling at a speed of between 5 and 120 m/min, preferentially between 10 and 80 m/min.

The method according to the invention makes it possible to place in plies reinforcers of various origins that might have taken on different degrees of bend during their manufacturing and/or storage on a reel, and thus greatly facilitates the management of the supply of reinforcers and the manufacturing of reinforced plies. The reinforced ply obtained, comprising at least one reinforcing element, has a flatness compatible with its incorporation into a method for manufacturing a green tire.

The manufacturing of a green tire comprises a step of manufacturing at least one reinforced ply according to the method of the invention. The method then comprises at least one step in which the reinforced ply/plies is/are wound onto a tire building drum in order to obtain a green tire. More specifically, the reinforced plies are positioned circularly on the green tire being manufactured and then the two ends of the ply are butted together.

DESCRIPTION OF THE FIGURES

FIG. 1 shows the measuring of the bend C of a sample of a reinforcer 33.

corners of the ply turn up is evaluated. A "–" evaluation indicates that the ply can be incorporated into a tire subject to the adjustment of the settings of the tire building machines or manual intervention, a "−−" evaluation indicates that the ply cannot be incorporated into a tire, and a "+" evaluation indicates that the ply can be incorporated into a tire without adjusting the settings of the building machines.

Table 1 collates the tests carried out.

TABLE 1

| Reinforcer | Bend before storage | Storage | Bend after storage (mm) | T (° C.) | time (s) | Condition T + 13.7 · ln(t) | Bend after heat treatment (mm) | Ply curl evaluation |
|---|---|---|---|---|---|---|---|---|
| 1.32 | 15 | 6 months | 140 | No treatment | | | | −− |
| 1.32 | 15 | 6 months | 140 | 270 | 1 | 270 | 15 | + |
| 1.32 | 15 | 6 months | 140 | 270 | 0.5 | 261 | 15 | + |
| 1.32 | 15 | 6 months | 140 | 150 | 2.5 | 163 | 40 | − |
| 9.35 | 15 | 1 month | 55 | 220 | 0.5 | 211 | 15 | + |
| 9.35 | 15 | 1 month | 55 | 120 | 2.0 | 130 | 50 | − |
| 9.35 | 15 | 1 month | 55 | 140 | 5.0 | 162 | 40 | − |

FIG. 2 schematically shows a method according to the invention. A plurality of reinforcers (30) is unwound from a plurality of storage means, here reels (20). The reinforcers of the plurality of reinforcers are positioned parallel to each other before being treated in a heat treatment step (40), and then feed a step (50) wherein the plurality of reinforcers is embedded in an elastomer composition in order to obtain a reinforced ply (60).

EXAMPLE

Measurements and Comparative Tests

In order to measure the bend of the reinforcer following storage and after treatment in step b) of the method according to the invention, the height of the arc formed by a sample of the reinforcer is measured as follows:

a reinforcer sample (33) having a length of 60 mm is cut, the bend C of the reinforcer sample (33) is measured as illustrated in FIG. 1, the reinforcer sample (33), laid on a horizontal plane, substantially forming an arc, the arc being characterized by its height or, in other words, the maximum distance between the arc and the chord (62) that underlies it, perpendicularly to the chord.

Three bend measurements are taken:

after wire drawing or assembly, just before the reinforcer is wound onto a "B80" reel with a view to storage, after storage, on a reinforcer sample taken from near the hub of the reel, that is, a sample that has undergone the greatest bending on winding, after heat treatment (where appropriate), in order to evaluate the reduction in bend prior to the step of embedding the cord in an elastomer matrix.

Two reinforcers are evaluated. The first, denoted "1.32", is a metallic monofilament having a diameter of 0.32 mm. The second, denoted "9.35"; it is a two-layer assembly of metallic monofilaments having a diameter of 0.35 mm, a 2+7 structure and a pitch of 7.7/15.4.

These two reinforcers are commonly used for reinforcing tire plies.

The "B80" storage reels are standard reels, having a hub diameter of 118 mm.

The "ply curl" is qualitatively assessed at the output of the step of embedding in an elastomer matrix. A width of ply is cut and positioned on a flat surface, and the way in which the It will be noted that implementing the method according to the invention makes it possible to obtain reinforced plies that can be incorporated into a rubber article, here a tire, without any need to adjust the settings of the building machines. In particular, applying the heat treatment makes it possible to return to the initial bend obtained at the end of the method for manufacturing the reinforcer (wire drawing or assembly).

The invention claimed is:

1. A method for manufacturing a reinforced ply comprising an elastomer composition and at least one metallic reinforcer, the method comprising at least the following successive steps:

(a) unwinding the at least one metallic reinforcer from storage means on which the at least one metallic reinforcer is wound;

(b) heat treating the at least one metallic reinforcer that has been unwound under temperature and time conditions such that $T+13.7 \cdot \ln(t)>175$ and such that $T+28.4 \cdot \ln(t)<398$, where T is a treatment temperature in C.° and t is a time for which the at least one metallic reinforcer is kept at the temperature T in seconds, wherein t is within an interval ranging from more than 0 to less than 20 s, and wherein temperature T is less than or equal to 300° C. if t is less than 2 s, and $T-23.8 \cdot \ln(t)<315$ if t ranges from 2 s to less than 20 s; and (c) feeding the at least one metallic reinforcer that has been heat treated into a step in which the at least one metallic reinforcer is embedded in an elastomer composition in order to obtain a reinforced ply, wherein the temperature T is within an interval ranging from 200 to 400° C., and wherein the metallic reinforcer is not coated with a polymer composition prior to step (c).

2. The method as set forth in claim 1, wherein t of step (b) is within an interval ranging from more than 0 to less than 60 s.

3. The method as set forth in claim 1, wherein t is within an interval ranging from more than 0 to less than 5 s.

4. The method as set forth in claim 1, wherein steps (a) to (c) take place continuously, step (b) being performed on a continuously travelling portion of reinforcer.

5. The method as set forth in claim 4, wherein the at least one metallic reinforcer travels at a speed of between 5 and 120 m/min.

6. The method as set forth in claim 1, wherein the metallic reinforcer is a single metallic filamentary element.

7. The method as set forth in claim 6, wherein a diameter of the single metallic filamentary element ranges from 0.05 mm to 0.60 mm.

8. The method as set forth in claim 6, wherein a diameter of the single metallic filamentary element ranges from 0.18 mm to 0.45 mm.

9. The method as set forth in claim 1, wherein the metallic reinforcer is an assembly of a plurality of metallic filamentary elements assembled together in a helix.

10. The method as set forth in claim 1, wherein the elastomer composition used in step (c) predominantly comprises a diene elastomer selected from a group consisting of natural rubber, synthetic polyisoprene or a mixture thereof.

11. The method as set forth in claim 1, wherein a plurality of metallic reinforcers are unwound from a plurality of storage means on which the plurality of metallic reinforcers is wound, the plurality of metallic reinforcers is collectively heat treated, and the plurality of metallic reinforcers that have been heat treated from step (b) is fed into a step in which the plurality of metallic reinforcers is embedded in an elastomer composition in order to obtain a reinforced ply.

\* \* \* \* \*